United States Patent [19]
Regutti

[11] Patent Number: 5,229,013
[45] Date of Patent: Jul. 20, 1993

[54] MATERIAL FOR USE IN TREATING EDIBLE OILS AND THE METHOD OF MAKING SUCH FILTER MATERIALS

[76] Inventor: Robert R. Regutti, 327 S. 1st, Geneva, Ill. 60234

[21] Appl. No.: 828,421

[22] Filed: Jan. 31, 1992

[51] Int. Cl.$^5$ .............................................. B01D 37/02
[52] U.S. Cl. ..................................... 210/778; 210/506
[58] Field of Search ................ 502/65; 427/180, 189, 427/201; 210/777, 510.1, 778, 501, 193, 506, 503, 502.1

[56] References Cited

U.S. PATENT DOCUMENTS 4,443,379  4/1984  Taylor et al. ........................ 502/65

Primary Examiner—Frank Sever
Attorney, Agent, or Firm—Marshall A. Burmeister

[57] ABSTRACT

The present invention relates to a particulate hydrated filter material containing clay for refining glyceride oil, including such oil containing contaminants resulting from the cooking of food. In addition, the present invention relates to methods of making such hydrated filter materials.

14 Claims, No Drawings

MATERIAL FOR USE IN TREATING EDIBLE OILS AND THE METHOD OF MAKING SUCH FILTER MATERIALS

BACKGROUND OF THE INVENTION

Edible oils have been refined from ancient times. Since the emergence of the fast food industry, the refining of edible oils has been extended to rejuvinating, refreshing and preserving used cooking oil. Also, the types of oil used in the fast food industry have expanded from animal fats to include vegetable oils, such as soybean, cottonseed, or palm oil.

In order to effectively treat the principal contaminating factors of used cooking oil, it is desirable to remove food particles, remove phospholipids, deodorize the oil and decolor the oil. A number of different processes have been developed for treating used cooking oil, but none of the processes to date have been sufficiently effective in treating all of the defects of the used cooking oil. It is an object of the present invention to provide a filter material which is effective in treating all of the principle contaminating factors of used cooking oil.

The art has several methods of treating used cooking oil which have the effect of reducing the production of soap. U.S. Pat. No. 4,764,384 of John Gyann entitled METHOD OF FILTERING SPENT COOKING OIL adsorbs free fatty acids by treating used cooking oil with a composition of silicates including a hydrated amorphous silica gel, thereby reducing the combination of free fatty acids and metallic ions and the resulting soap. Another approach to controlling the concentration of free fatty acids by adsorption is described in U.S. Pat. No. 4,235,795 of Cohen, and this approach admixes pumicite with used cooking oil as an adsorbent for free fatty acids. A third method of treating used cooking oil to reduce soap is described in U.S. Pat. No. 4,330,564 of Friedman in which a chelating agent is admixed with the cooking oil to tie up the metal ions and prevent the combination of free fatty acids and metal ions and the resulting production of soap. Another method of treating used cooking oil to prevent soap is described in U.S. Pat. No. 3,231,390 of Hoover in which used cooking oil is treated with an adsorbent consisting of an alkaline earth metal carbonate or an alkaline earth metal oxide, and the adsorbent is removed from the oil by filtration. It is believed that the process of Hoover is a saponification process which removes the metallic ions as soap in the filtration step.

These processes are effective in preventing the formation of soap and filtering food particles from the used cooking oil, but these processes do not decolor the used oil. Cooking oil is maintained at an elevated temperature during the cooking process, a temperature of about 300 to 400 degrees Fahrenheit. The elevated temperature and the presence of food juices and particles causes the oil to gradually darken in color until it reaches a dark brown color. It is generally believed that the dark brown color is a precursor to rancidity, and it may cause the oil to be discarded before it becomes too contaminated for continued use.

Further, filter media differ in their effect on the taste and odor of products cooked in used and filtered cooking oil. The products pick-up the odor of the cooking oil and taste from the cooking oil. Hence it is a further object of the present invention to provide a filter media which excels in deodorizing used cooking oil and which imparts a superior flavor to products cooked with used cooking oil which has been filtered with that filter media.

It is also an object of the present invention to provide a filter media useful in the refining of raw glyceride oil. While raw glyceride oil is not subjected to crumbs and juices from cooking food, free fatty acids must be refined from such oil. Further, deodorization, decolorization, removing phospholipids, soap, and oxydized matter are important in the processes of refining such oils.

SUMMARY OF THE INVENTION

The present invention modifies and enhances the absorbent properties of clay by the addition of substantial free water to produce a filter media which is effective in refining raw glyceride oils and used cooking oil. Clay has been used in natural and activated form in various filter media in the past, but not with the addition of substantial free water. U.S. Pat. No. 3,590,059 to M. E. Velan entitled *Process for the Purification of Edible Oils*, U. S. Pat. No. 3,895,042 of Frederik T. Taylor entitled *Clay-Heat Refining Process*, U.S. Pat. No. 4,735,815 of Dennis R. Taylor entitled *Treatment of Impure Frying Oils*, and United Kingdom Patent No. 1,509,664 of Asahi Denka Kogyo Kabushiki Kaisha entitled *A Process for Refining Glyceride Oils or Fats* are examples of filter media employing clay as taught by the art. These patents teach the use of the bleaching properties of clay in a filter media.

While the inventor does not intend to be bound to any theory, the inventor believes that the addition of free water to clay materially increases the absorption properties of clay for phospholipids, ketones, aldehydes and the like. Clay is known to be a fine-grained, hydrous, layered structure of silicates. The sheets are composed of silicon-oxygen tetrahedra linked to other tetrahedra by sharing three corners to form a hexagonal network. The fourth corner of each of the tetrahedra is the apical oxygen, and forms a part of the adjacent sheet which is an octahederal sheet.

The presence of water will cause the structure of clay to swell, but the layers retain their structure as a result of the electrical attraction of the silicon and oxygen atoms. However, the swelling of the clay has the effect of opening up active cites on the clay molecules, including between layers, which permit O-H atoms from the moisture present to adhere to the silica atoms of the clay. It is believed that molecules of the impurities in the used oil attach themselves to the free O-H cites on the silica formed by the moisture present. In this way, the capacity of the clay to absorb impurities from the oil is greatly increased by the presence of moisture.

Clay has interstitial moisture and free moisture. When clay is mined, it contains interstitial water and perhaps free water. In order to grind clay, it is dried, removing the free moisture and a portion of the interstitial water. After grinding, clay still contains 10% interstitial moisture ± about 5%. It is believed that very little of this interstitial water enters into expanding the active cites on the clay, and that it is largely free water that is effective for this purpose. Hence, the present invention depends on the addition of free water to the clay.

According to the present invention, between 5% and 35% water by weight is added to the clay. Clay ceases to act like powder and balls when water is added to the clay mass. In order to maintain the clay in manageable form and to improve the ability of the filter media to remove contaminants, silica in the form of fine particles is admixed with the clay before the moisture is added. The silica should also absorb oil degradation products, and expanded perlite has been found to be the preferred silica for mixture with the clay.

Hence, the present invention provides a filter media for use in filtering glyceride oils, and specifically used cooking oil, in which a mass of clay constituting between 10% and 55% by weight of the filter media and a plurality of granules of silica constituting between 10% and 85% by weight of the filter media are uniformly intermixed, and a mass of water constituting between 5% and 35% by weight of the filter media is distributed in both the silica and clay and substantially uniformly mixed with the clay.

DETAILED DESCRIPTION OF THE INVENTION

The present invention may be practiced with most available clays. It is conventional commercial practice to mine clay and the raw clay contails considerable moisture, both interstitial moisture and free or unbound moisture. The clay is generally too moist to effectively grind, and it is first dried. The drying process first removes the free moisture from the clay, and as the temperature of the clay increases, the interstitial or bound moisture is partially removed. Thereafter the clay is ground, and the ground product will retain significant moisture, largely of the bound or interstitial type. In practice, commercial clay has been found to contain approximately 10% moisture ±5%, and such clays are suitable for the present invention.

The inventor has found that clays which swell are preferred for the present invention, although other clays, both natural and acid activated clays, may also be used. Particularily suitable clays for use in filters material for use with used edible cooking oils are smectite, beidelite, montmorillonite, dioctahedral vermiculite, trioctahederal vermiculite, illite, saponite, hectorite, bentonite, muscovite, celadonite, and leucophylite.

The silica particles have two functions, namely, to separate the clay to permit proper hydration and to absorb additional impurities from the oil. Virtually any silica may be used in the present invention, but certain silca particles are preferred. Expanded silica products, such as expanded perlite and expanded pumicite are most preferred. The particularily suitable silicas are metal silicates including magnesium silicate and calcium silicate, perlite, pumicite, rhyolite, volcanic ash, silica gel, vermiculite, and diatamaceous earth.

The size of the silica granules depends upon the use of the filter material. Restaurants generally use gravity feed filters and vacuum filters, whether the filter media is directly added the vat containing the used cooking oil or flowed through a filter paper coated with the filter media. Coarse grades of silica are required for such uses. In the case of expanded perlite, a course grade is commercially available which has granules from 70 microns to 120 microns, and this grade is desirable for this service. Food processors have pressure mechanical filtration, and medium to fine grades of silica are suitable for filter media for use with such filters. In the case of expanded perlite, commercially available medium grades have particles of 40 microns to 70 microns, and fine grades have particles of 20 to 40 microns. Blends of medium and fine grades of expanded perlite are suitable for filter media to be used in oil refinery processes.

If the quantity of water to be added to clay under the present process is added directly to the clay, the clay will become too moist and be difficult to handle. Accordingly, the clay is first mixed with the silica particles to form a substantially uniform mixture of silica particles and clay. Thereafter, the water is added to the mixture of clay and silica particles, preferably by spraying or pouring water on the mixture of clay and silica particles while maintaining agitation of the mixture.

For best results, the filter media is used with hot oil, that is oil having a temperature close to the cooking temperature used with the oil. Most cooking in fast food restaurants is conducted at temperatures between 325 degrees and 375 degrees Fahrenheit, and all examples of the filter media have been conducted at or above 300 degrees Fahrenheit.

The inventor obtained a batch of used cooking oil from a fast food restaurant which had been used for fourteen days and contained color bodies, polymerized breakdown components and sub-micron sized burnt food and oil particles. Samples of this oil at a temperature above 300 degrees Fahrenheit were passed through a Buchner funnel containing a layer of filter paper and a filter cake of the filter media under test. The filter cake constituted 2% of the sample by weight, and each of the samples was 200 cubic centimeters.

EXAMPLE 1

A sample equal by weight to 2% of a 200 cubic centimeter sample of the used cooking oil was made up consisting of 45% by weight fine ground natural montmorillonite, 35% by weight course grade expanded perlite and 20% by weight water. The clay and the expanded perlite were first uniformly admixed, and the water was thereafter sprayed onto the perlite and clay while maintaining agitation of the mixture to produce a hydrated uniform mixture. The sample of filter media was then placed on a filter paper in a Buchnew funnel, thus forming a filter cake, and the 200 cubic centimeter sample of the used cooking oil described above at a temperature of about 325 degrees Fahrenheit was passed through the filter cake in the Buchner funnel. The filtered oil was tested for flavor and aroma, free fatty acids, and color by measuring ultra violet light transmission.

A Milton Roy Co. Spectronic 20D spectophotometer was used to measure the ultra violet viscosity of the filtered oil through a 1 centimeter path at 520 micrometers and 650 micrometers, and yielded a reading of 55% and 93%, respectively. The used cooking oil prior to filtration transmitted 30.5% and 83%, respectively, at these wavelengths, thus showing a marked improvement after filtration.

Filtration also reduced the free fatty acid content of the oil sample under test from 3.4% to 3.2%. In addition, the oil aroma was observed to improve with filtration from unacceptable to very acceptable, and the oil flavor was also observed to improve with filtration from unacceptable to very acceptable.

EXAMPLE 2

A sample equal by weight to 2% of a 200 cubic centimeter sample of the used cooking oil was made up consisting of 45% by weight fine ground natural montmorillonite, 45% by weight course grade expanded perlite and 10% by weight water. The sample was prepared in the same manner as Example 1, and the same tests were made on the filter media of Example 2 as were made on Example 1. The spectophotometer tests on the filtered used cooking oil of Example 2 yielded readings of 34.5% and 85.5% at 520 micrometers and 650 micrometers, respectively. The used cooking oil prior to filtration transmitted 30.5% and 83%, respectively, at these wavelengths, thus showing an improvement after filtration, but a smaller improvement than Example 1.

Filtration failed to reduce the free fatty acid content of the oil sample of Example 2 from 3.4%. The oil aroma was observed to improve with filtration from unacceptable to fair, and the oil flavor was also observed to improve with filtration from unacceptable to fair.

EXAMPLE 3

A sample equal by weight to 2% of a 200 cubic centimeter sample of the used cooking oil was made up consisting of 45% by weight fine ground natural montmorillonite, 25% by weight course grade expanded perlite and 30% by weight water. The sample was prepared in the same manner as Example 1, and the same tests were made on the filter media of Example 3 as were made on Example 1. The spectophotometer tests on the filtered used cooking oil of Example 3 yielded readings of 55.5% and 93% at 520 micrometers and 650 micrometers, respectively. The used cooking oil prior to filtration transmitted 30.5% and 83%, respectively, at these wavelengths, thus showing an improvement after filtration about equal to the improvement than Example 1.

Filtration failed to educe the free fatty acid content of the oil sample of Example 3 from 3.4%. The oil aroma was observed to improve with filtration from unacceptable to very good, and the oil flavor was also observed to improve with filtration from unacceptable to very good.

The above examples were confirmed with samples of 50 pounds of spent cooking oil, and indicate that the best results are obtained with the addition of about 20% by weight water to a mixture of 45% clay by weight and 35% perlite by weight, and the inventors tests indicate that this is true regardless of the interstitial moisture of the clay used to form the filter media.

EXAMPLE 4

Tests were also conducted in which a mixture made up in the manner of Example 1 used 5% by weight of water to a mixture of 45% clay by weight and 50% perlite by weight. Spectophotometer tests on the filtered used cooking oil of Example 4 yielded readings of 32% and 78% at 520 micrometers and 650 micrometers, respectively. The used cooking oil prior to filtration transmitted 30.5% and 83%, respectively, at these wavelengths, thus showing a slight improvement at the lower wavelenth and a degregation at the higher wavelength after filtration. Free fatty acid measurements remained the same as before filtration, but the aroma and flavor of the oil improved from unacceptable to fair.

The filter cake made of the filter media of the present invention may be used to filter a plurality of samples without losing its effectiveness. Using 50 pound vats of spent cooking oil, the inventor has found that seven vats of oil at about 325 degrees Fahrenheit may be filtered through a filter cake having the formulation of Example 1. Further, the filter cake retained moisture after filtering the seven vats, thus indicating that the clay retains significant moisture even after repeated filtrations of oil at normal cooking temperatures.

Those skilled in the art will devise many uses and applications for the present invention beyond that here disclosed. It is therefore intended that the present invention be not limited by the foregoing disclosure, but rather only by the appended claims.

The invention claimed is:

1. A filter media for use in filtering glyceride oils consisting essentially of a mass of clay constituting between 10% and 55% by weight of the filter media, a plurality of granules of silica constituting between 10% and 85% weight of the filter media, and a mass of water constituting between 5% and 35% by weight of the filter media, the clay and silica being substantially uniformly mixed together, and the water being distributed in both the silica and clay and being substantially uniformly distributed in the clay, said mass of water being sufficient for providing said media with properties sufficient for effectively filtering said oils.

2. A filter media for use in filtering glyceride oils consisting essentially of the combination of claim 1 wherein the clay is from the class consisting of smectite, beidelite, montmorillonite, dioctahedral vermiculite, trioctahederal vermiculite, illite, saponite, hectorite, bentonite, muscovite, celandonite, and leucophylite.

3. A filter media for use in filtering glyceride oils consisting essentially of the combination of claim 1 wherein the silica is from the class consisting of metal silicates including magnesium silicate and calcium silicate, perlite, pumicite, rhyolite, volcanic ash, silica gel, vermiculite, and diatamaceous earth.

4. A filter media for use in filtering glyceride oils consisting essentially of the combination of claim 3 wherein the silica comprises expanded perlite.

5. A filter media for use in filtering glyceride oils consisting essentially of the combination of claim 3 wherein the silica comprises expanded pumicite.

6. A filter media for use in filtering used cooking oils consisting essentially of the combination of claim 1 wherein the mass of clay consists essentially of smectite constituting approximately 45% by weight of the filter media, the granules of silica consist essentially of expanded perlite and constitute approximately 35% by weight of the filter media, and the mass of water constitutes 20% by weight of the filter media.

7. A filter media for use in filtering used cooking oils consisting essentially of the combination of claim 1 wherein the mass of clay consists essentially of montmorillonite constituting approximately 45% by weight of the filter media, the granules of silica consist essentially of expanded perlite and constitute approximately 35% by weight of the filter media, and the mass of water constitutes 20% by weight of the filter media.

8. A filter media for use in filtering used cooking oils consisting essentially of the combination of claim 1 wherein the mass of clay consists essentially of smectite constituting approximately 45% by weight of the filter media, the granules of silica consist essentially of expanded perlite and constitute approximately 25% by weight of the filter media, and a mass of water consists of 30% by weight of the filter media.

9. A filter media for use in filtering used cooking oils consisting essentially of the combination of claim 1 wherein the mass of clay consists essentially of acid activated clay.

10. The method of making a filter media for use with glyceride oils consisting essentially of the steps of admixing clay in an an amount constituting at least 35% by weight of the filter media with granules of silica in an amount constituting at least 30% by weight of the filter media to produce a uniform mixture, and thereafter adding water in an amount constituting by weight between 5% and 35% of the filter media to the mixture of clay and silica, said water being sufficient for providing said media with properties sufficient for effectively filtering said oils.

11. The method of making a filter media for use with used cooking oils consisting essentially of the steps of claim 10 wherein the clay is selected from the class consisting of smectite, beidelite, montmorillonite, dioctahedral vermiculite, trioctahederal vermiculite, illite, saponite, hectorite, bentonite, muscovite, celandonite, and leucophylite.

12. The method of making a filter media for use with used cooking oils consisting essentially of the steps of claim 10 wherein the silica is selected from the class consisting of metal silicates including magnesium silicate and calcium silicate, perlite, pumicite, rhyolite, volcanic ash, silica gel, vermiculite, and diatamaceous earth.

13. The method of making filter media for use with used cooking oils consisting essentially of the steps of claim 10 wherein the clay constitutes approximately 45% of the filter media by weight and comprises montmorillonite, the silica constitutes approximately 35% of the filter media by weight and comprises expanded perlite, and the water constitutes approximately 20% of the filter media by weight.

14. A filter media for use in filtering glyceride oils consisting essentially of a mass of montmorillonite clay constituting approximately 45% by weight of the filter media, a plurality of perlite granules constituting between 25% and 35% by weight of the filter media, and a mass of water constituting between 20% and 30% by weight of the filter media, said mass of water being sufficient for providing said media with properties sufficient for effectively filtering said oils.

* * * * *